US 12,508,764 B2

(12) United States Patent
Nava et al.

(10) Patent No.: US 12,508,764 B2
(45) Date of Patent: Dec. 30, 2025

(54) VALVE ASSEMBLY FOR BLOWING OR DRAW-BLOWING BOTTLES MADE OF POLYMER MATERIAL

(71) Applicant: SMI S.P.A., Bergamo (IT)

(72) Inventors: Angelo Nava, Bergamo (IT); Damiano Pesenti, Bergamo (IT)

(73) Assignee: SMI S.P.A, Bergamo (IT)

( * ) Notice: Subject to any disclaimer, the term of this patent is extended or adjusted under 35 U.S.C. 154(b) by 430 days.

(21) Appl. No.: 17/972,790

(22) Filed: Oct. 25, 2022

(65) Prior Publication Data
US 2023/0131697 A1   Apr. 27, 2023

(30) Foreign Application Priority Data
Oct. 26, 2021  (IT) .................. 102021000027404

(51) Int. Cl.
B29C 49/42     (2006.01)
B29L 31/00     (2006.01)
(Continued)

(52) U.S. Cl.
CPC ........ B29C 49/4289 (2013.01); F16K 27/003 (2013.01); F16K 31/0624 (2013.01); *B29L 2031/7158* (2013.01)

(58) Field of Classification Search
CPC ........ B29C 49/4289; B29C 2049/6271; B29C 2049/7832; F16K 27/003; F16K 31/0624; B29L 2031/7158
See application file for complete search history.

(56) References Cited

U.S. PATENT DOCUMENTS

| 2008/0213423 A1* | 9/2008 | Leblond ............... B29C 49/42 425/536 |
| 2010/0201013 A1* | 8/2010 | Monin .................. B29C 49/58 425/149 |

(Continued)

FOREIGN PATENT DOCUMENTS

| EP | 1193401 B1 | 8/2006 |
| EP | 2837486 B1 | 9/2018 |
| WO | 2020025766 A1 | 2/2020 |

OTHER PUBLICATIONS

Italian Search Report for IT Patent Application No. 2021000027404, mailed May 12, 2022, 9 pages.

Primary Examiner — S. Behrooz Ghorishi
(74) Attorney, Agent, or Firm — Armstrong Teasdale LLP

(57) ABSTRACT

The present invention relates to a valve assembly for blowing or draw-blowing preforms made of polymer material, applicable to a machine suitable to transform said preforms into bottles or containers.
In particular, the invention relates to a valve assembly (1) comprising a control block (2) and a blowing block (3), in which the blowing block (3) comprises an outer body (50) having a longitudinal axis, inside which a blowing cylinder ending at the bottom with a nozzle (58) suitable to be coupled with the neck of a container (C), is slidingly accommodated, and wherein the control block (2) receives pressurized air from at least one pressurized air source and sends it to said blowing block (3) according to a predetermined pressure profile dependent on the selected blowing cycle, in which the control block (2) comprises a plurality of valves for dispensing pressurized air at different pressures, and an air exhaust valve, characterized in that said valves are driven by pressurized air at a pressure between 15 and 40 bar.

10 Claims, 14 Drawing Sheets

(51) Int. Cl.
   *F16K 27/00*   (2006.01)
   *F16K 31/06*   (2006.01)

(56) References Cited

U.S. PATENT DOCUMENTS

2014/0103584 A1  4/2014  Pagliarini et al.
2015/0050381 A1  2/2015  Schmidt

* cited by examiner

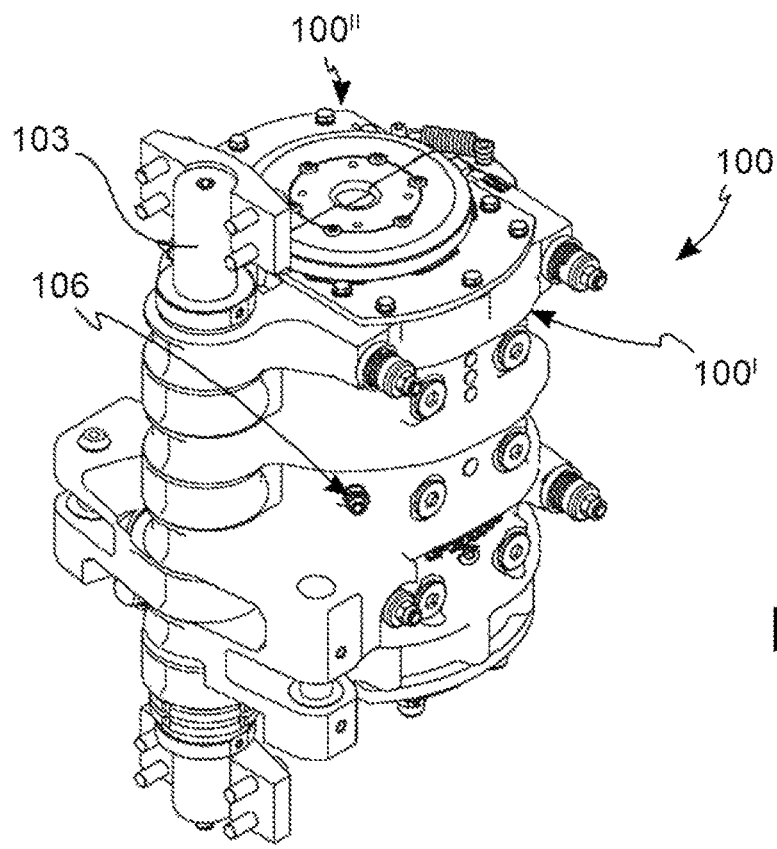
FIG. 10
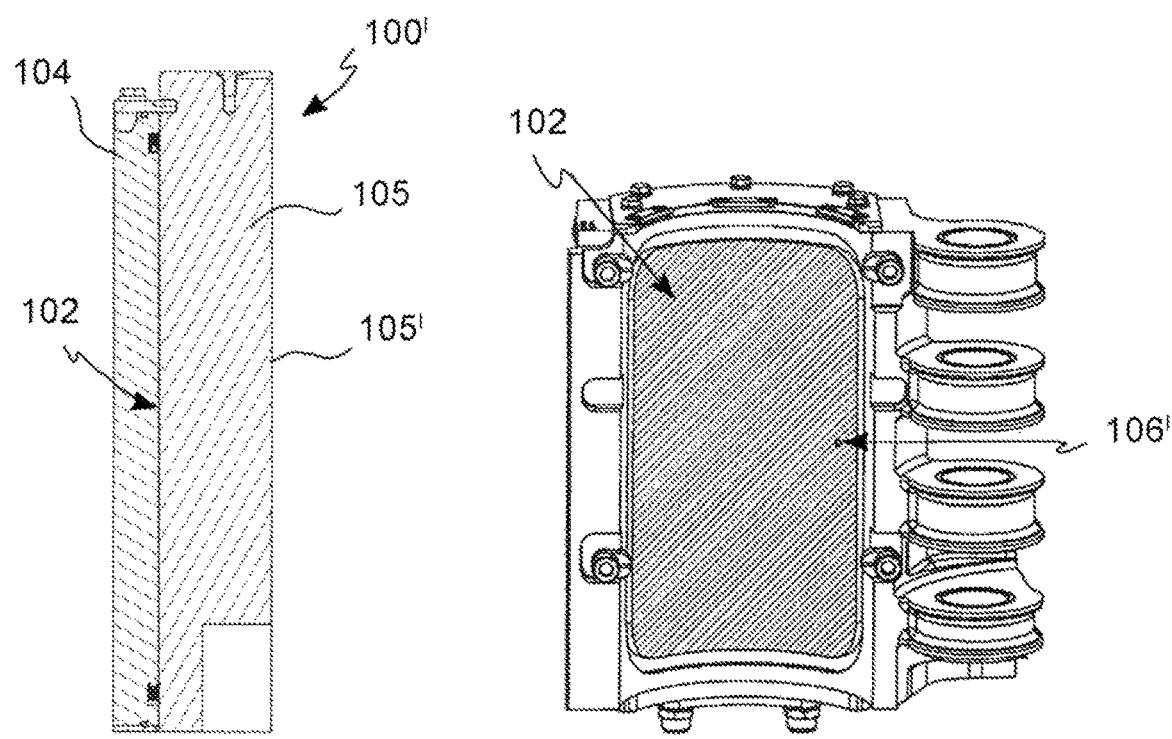
FIG. 11
FIG. 12

VALVE ASSEMBLY FOR BLOWING OR DRAW-BLOWING BOTTLES MADE OF POLYMER MATERIAL

CROSS-REFERENCE TO RELATED APPLICATIONS

This application claims the benefit of priority to Italian Patent Application No. 102021000027404, filed on Oct. 26, 2021, the entire contents of which are hereby incorporated by reference in their entirety.

FIELD OF THE INVENTION

The present invention relates to a valve assembly for blowing or draw-blowing preforms made of polymer material, applicable to a machine suitable to transform said preforms into bottles or containers.

BACKGROUND ART

Obtaining bottles or containers by blowing special preforms appropriately heated inside a mold of the desired shape is a widely known technique in the packaging sector, in particular for making bottles or containers.

There are substantially two different techniques, simple blowing, and draw-blowing which provides for the pneumatic blowing and concurrent mechanical drawing of the preform in the mold. In both cases, the preforms must reach the blowing or draw-blowing machine in a thermal condition which corresponds to the softening point of the material, to be able to be plastically deformed inside the molds.

Blowing or draw-blowing machines for preforms are known and comprise a plurality of openable molds comprising two half-molds hinged at an end and activated by means of appropriately arranged leverages sized to allow the opening and closing thereof in a synchronized manner with predetermined steps of loading the preforms and unloading the formed bottle.

In rotary machines, a plurality of molds is arranged radially about a central rotation axis, and the means for opening and closing the molds are synchronized with the movement of other devices which cooperate in the operation of the machine, for example, a movement device for the entering preforms and the exiting bottles, and a blowing and moving device for different components of the molds.

The blowing or draw-blowing device comprises a valve assembly suitable to be arranged on the mouth of the preform when it is enclosed in the mold, and to introduce air therein at high pressure. The blowing or draw-blowing operation usually occurs in two separate steps, a pre-blowing step with a lower initial pressure, usually between 4 and 10 bar, and a blowing step with pressures between 15 and 40 final bar. Such a pressurized air introduction sequence is regulated by specific valves.

In this regard, pneumatic systems for driving these valves are known, which exploit the availability of pressurized air in the system for the blowing.

SUMMARY OF THE INVENTION

The problem addressed by the present invention is to provide a valve assembly for blowing or draw-blowing plastic material bottles which optimizes the use of pressurized air for driving the valves and which involves simplifying the pneumatic diagram of the machine.

Such a problem is resolved by a valve assembly for blowing or draw-blowing bottles or containers made of polymer material, as outlined in the appended claims.

In particular, the invention relates to the following objects:

1) a valve assembly comprising a control block and a blowing block, in which the blowing block comprises an outer body having a longitudinal axis, inside which a blowing cylinder ending at the bottom with a nozzle suitable to be coupled with the neck of a container, is slidingly accommodated, and in which the control block receives pressurized air from at least one pressurized air source and sends it to said blowing block according to a predetermined pressure profile dependent on the selected blowing cycle, in which the control block comprises a plurality of valves for dispensing pressurized air at different pressures, and an air exhaust valve, characterized in that said valves are driven by pressurized air at a pressure between 15 and 40 bar;

2) a valve assembly as defined in point 1), in which the control block comprises a first conduit for pressurized air at a first pressure, a second conduit for pressurized air at a second pressure which is greater than the first pressure, and a third conduit for pressurized recovery air at a third pressure which is greater than or equal to said first pressure and less than or equal to said second pressure, in which said first, second and third conduits are intercepted by said first, said second and said third valve for dispensing pressurized air, respectively, at said first, second and third pressure, and in which said dispensing valves are connected to a transverse conduit which in turn comprises an opening for connecting to the blowing block;

3) a valve assembly as defined in point 2), in which said first and second conduits are pneumatically connected to a pressurized air manifold comprising a first chamber for supplying pressurized air at said first pressure and a second chamber for supplying pressurized air at said second pressure, and in which said third conduit is pneumatically connected to a storage tank of pressurized air at said third pressure;

4) a valve assembly as defined in point 2) or 3), in which the first conduit is intercepted by a flow regulator of said pressurized air at said first pressure;

5) a valve assembly as defined in any one of points 2) to 4), in which said first and second conduits are intercepted upstream of said dispensing valves by respective unidirectional valves configured to prevent the pressurized air at said first and second pressure from returning towards the manifold;

6) a valve assembly as defined in any one of points 2) to 5), in which said first, second and third dispensing valves and said exhaust valve are placed perpendicularly to said first, second and third pressurized air inlet conduits and to said transverse conduit, respectively, and in which each of said dispensing and exhaust valves comprises:

an H-shaped piston comprising a stem, a first head, and a second head, in which said heads have a greater diameter than the stem, a complementary seat in which the piston slides, said complementary seat having a middle portion, a first expansion chamber at the first head of the piston and a second expansion chamber at the second head of the piston, in which:
i) both the first head and the second head comprise respective outer surfaces and respective shoulders, the shoulders being configured to be coupled with the respective abutment surfaces of said expansion chambers,
ii) a gap is arranged between the middle portion of the seat and the stem of the piston, in the section connecting the first expansion chamber to the transverse conduit,
iii) the outer surface of the first head of the pistons is star-shaped and comprises a plurality of chamfers which create micro channels along a side surface of the first head which are configured to allow the passage of pressurized air through the gap;

7) a valve assembly as defined in any one of points 2) to 6), in which a first branch conduit, which is T-shaped and comprises a first portion perpendicular to the second conduit and a second portion which extends along a transverse direction with respect to said first, second and third conduits and which lies on a plane parallel to the plane on which the axes of said first, second and third conduits lie, starts from the second conduit for the pressurized air at the second pressure, and in which the following starts from said second portion of the first branch conduit:
   a second branch conduit which extends perpendicularly to the plane in which the first branch conduit lies;
   a first driving channel intercepted by a first solenoid control valve;
   a second driving channel intercepted by a second solenoid control valve,
   and in which a third branch conduit which extends on a plane parallel to the first branch conduit starts from the second branch conduit, in which a third and fourth driving channels intercepted by a third and fourth solenoid control valve, respectively, perpendicularly start from said third branch conduit in the same plane parallel to the first branch conduit;
8) a valve assembly as defined in point 7), in which the first, third and fourth solenoid control valves drive the third, first and second dispensing valve, respectively, by means of respective outlet channels which start from said solenoid control valves and which lead into the upper part of the second expansion chamber of the respective dispensing valves;
9) a valve assembly as defined in point 7) or 8), in which the second driving channel intercepted by the second solenoid control valve is connected downstream of the latter to a counter-pressure chamber of a mold;
10) a valve assembly as defined in any of points 6) to 9), in which the exhaust valve is connected downstream to an air exhaust device and in which a fifth driving channel of said air exhaust valve starts from the second conduit of pressurized air at said second pressure, in which said exhaust valve is mounted in reverse position with respect to the dispensing valves so that the outer surface of the first head faces upwards, in which the fifth channel is intercepted by a respective solenoid control valve and continues downstream of said solenoid valve in an outlet channel which leads into the second expansion chamber of the seat, in intermediate position between said abutment surface and said shoulder;
11) a valve assembly as defined in any one of points 7) to 10), in which the outer body of the blowing block comprises an opening which is put into flow connection with the opening of the control block from which the pressurized air is dispensed, an inner surface of the outer body further comprising an upper recess and a lower recess so as to form an upper annular chamber and a lower annular chamber with an outer surface of the blowing cylinder,
and in which the blowing cylinder is hollow and comprises a longitudinal channel which opens outwards at the nozzle, there being arranged, between an inner surface and the outer surface of the blowing cylinder, a plurality of radial channels which connect the outside of the blowing cylinder with the longitudinal channel and which extend along a downwards tilting direction from the outer surface to the inner surface,
and in which said second branch conduit of the control block is connected to a conduit of the blowing block, which in turn is connected to two solenoid control valves of the blowing block configured to send pressurized air at said second pressure alternately to the upper annular chamber or to the lower annular chamber so that when the pressurized air is introduced into the upper annular chamber, the blowing cylinder slides downwards up to engaging the neck of a preform, and simultaneously the opening of the outer body from which the pressurized air is introduced aligns with the radial channels of the blowing cylinder; when instead the pressurized air is introduced into the lower annular chamber, the blowing cylinder slides upwards so as to disengage from the neck of the container and discontinue the blowing air flow;
12) A machine for blowing or draw-blowing containers, comprising a plurality of molds, a valve assembly as defined in any one of points 1) to 11) being mounted on each mold, said machine comprising at least one pressurized air manifold comprising a first chamber for supplying pressurized air at said first pressure and a second chamber for supplying pressurized air at said second pressure, and at least one storage tank of pressurized air at said third pressure.

Further features and advantages of the present invention will become more apparent from the description of certain embodiments thereof, given hereafter only by way of a non-limiting, indicative example.

BRIEF DESCRIPTION OF THE DRAWINGS

FIG. 7B shows the view in FIG. 7A, in a second operating condition.

FIG. 10 shows a perspective view of the mold alone;

FIG. 11 shows a perspective view of a half-mold, showing the inner face thereof;

FIG. 12 shows a longitudinal sectional view of a detail of a half-mold.

DETAILED DESCRIPTION OF THE INVENTION

Figure 1:
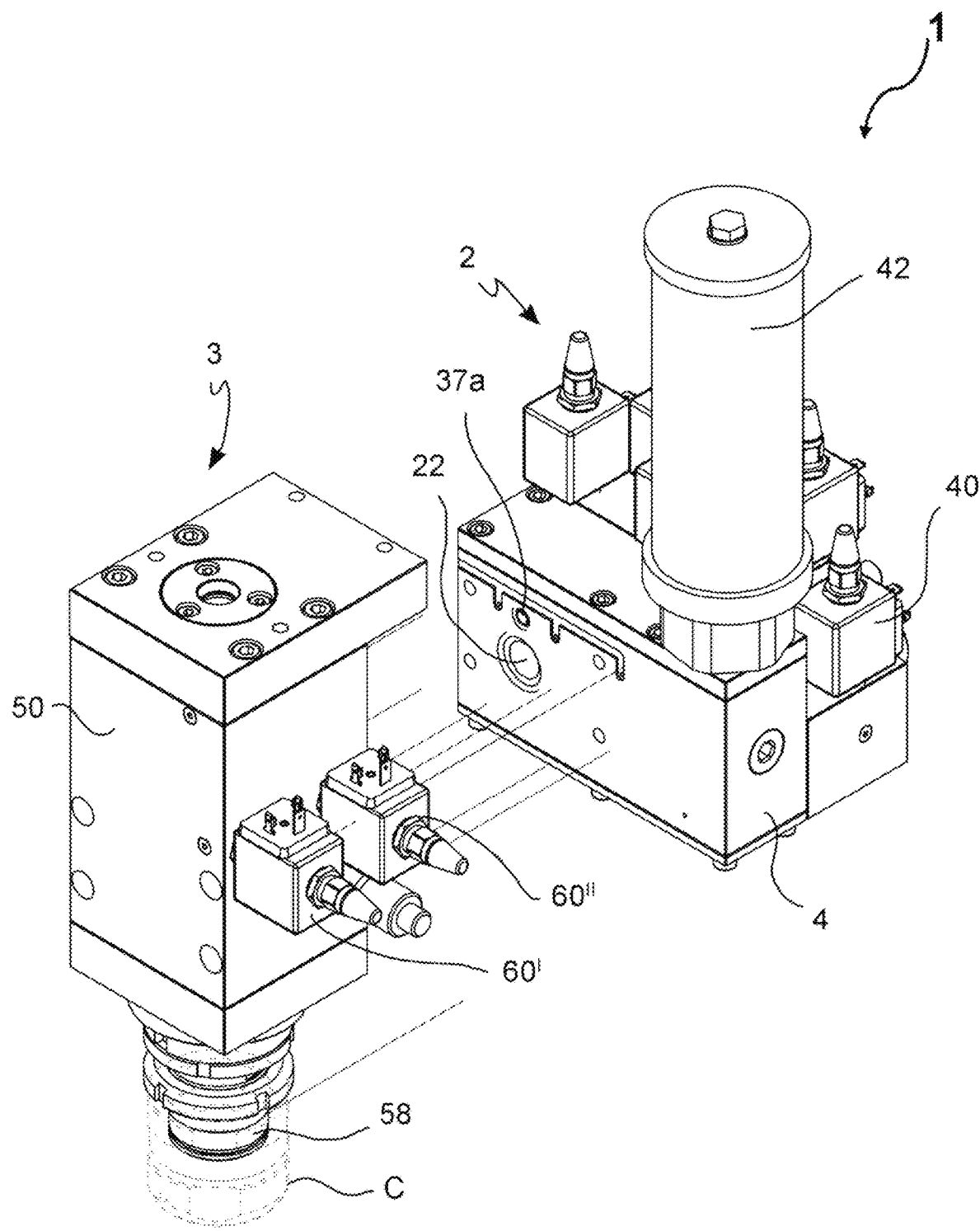
FIG. 1 shows a partial exploded perspective view of the valve assembly according to the invention.
Figure 2:
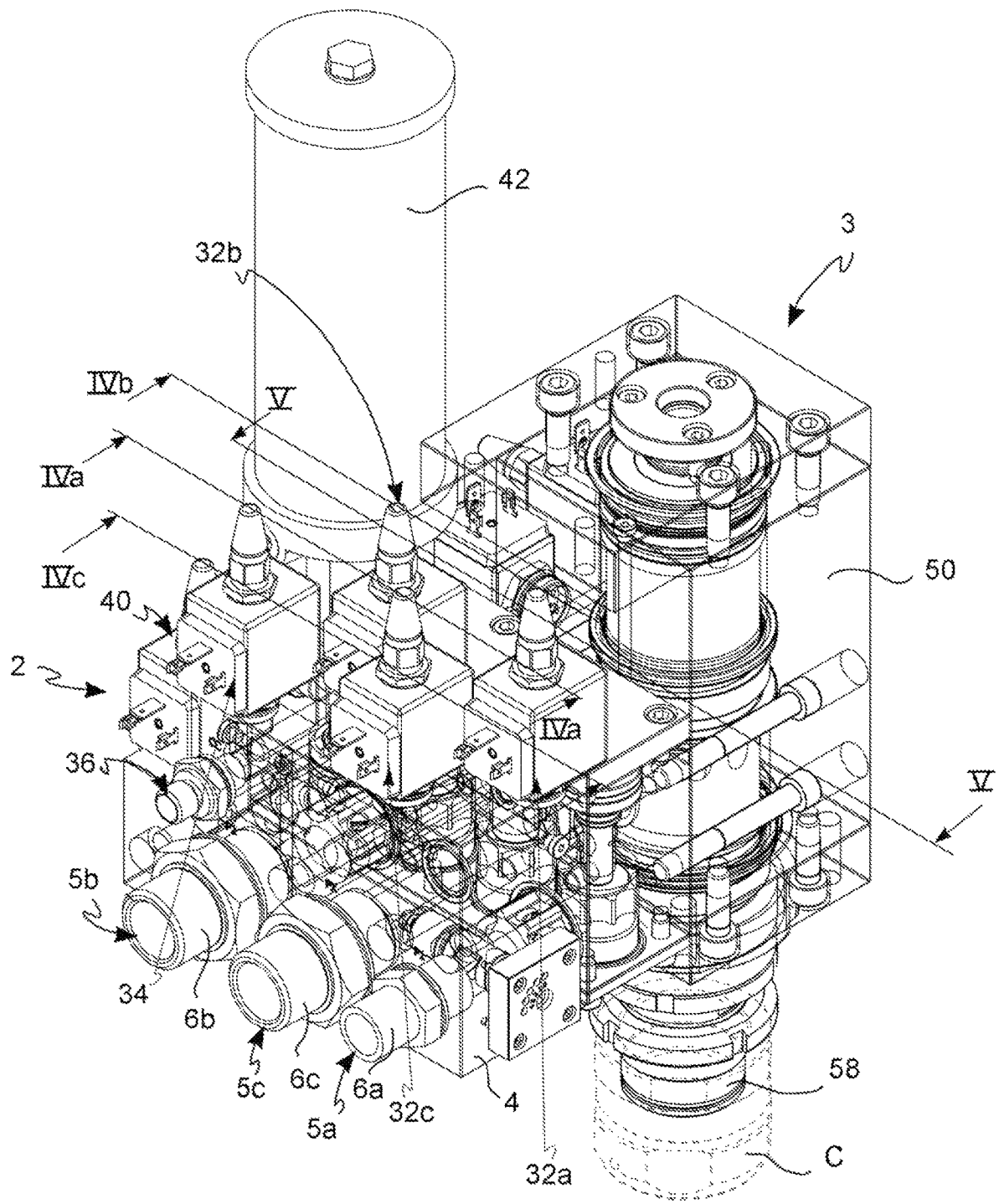
FIG. 2 shows a partial transparency view of the valve assembly according to the invention.

FIG. 1 shows, in its entirety, the valve assembly, indicated by numeral 1, comprising a control block 2 and a blowing block 3, which are shown in disassembled condition, while FIG. 2 shows the valve assembly 1 in assembled condition.

The control block 2 serves the function of receiving pressurized air from one or more pressurized air sources, and sending said pressurized air to the blowing block 3 with a predetermined pressure profile.

The blowing block 3 receives said pressurized air with said predetermined pressure profile from the control block 2 and introduces said pressurized air into a heated preform inside a mold 100 for forming a container by means of blowing or draw-blowing.

The predetermined pressure profile may vary according to the container to be made, and generally comprises:
a first step, or pre-blowing step, at a first pressure P1;
a second step, or blowing step, at a second pressure P2 which is greater than or equal to P1;
a third step, or exhausting step of the overpressure.

The first pressure P1 generally is between 4 and 15 bar, while the second pressure P2 generally is between 15 and 40 bar.

Figure 3:
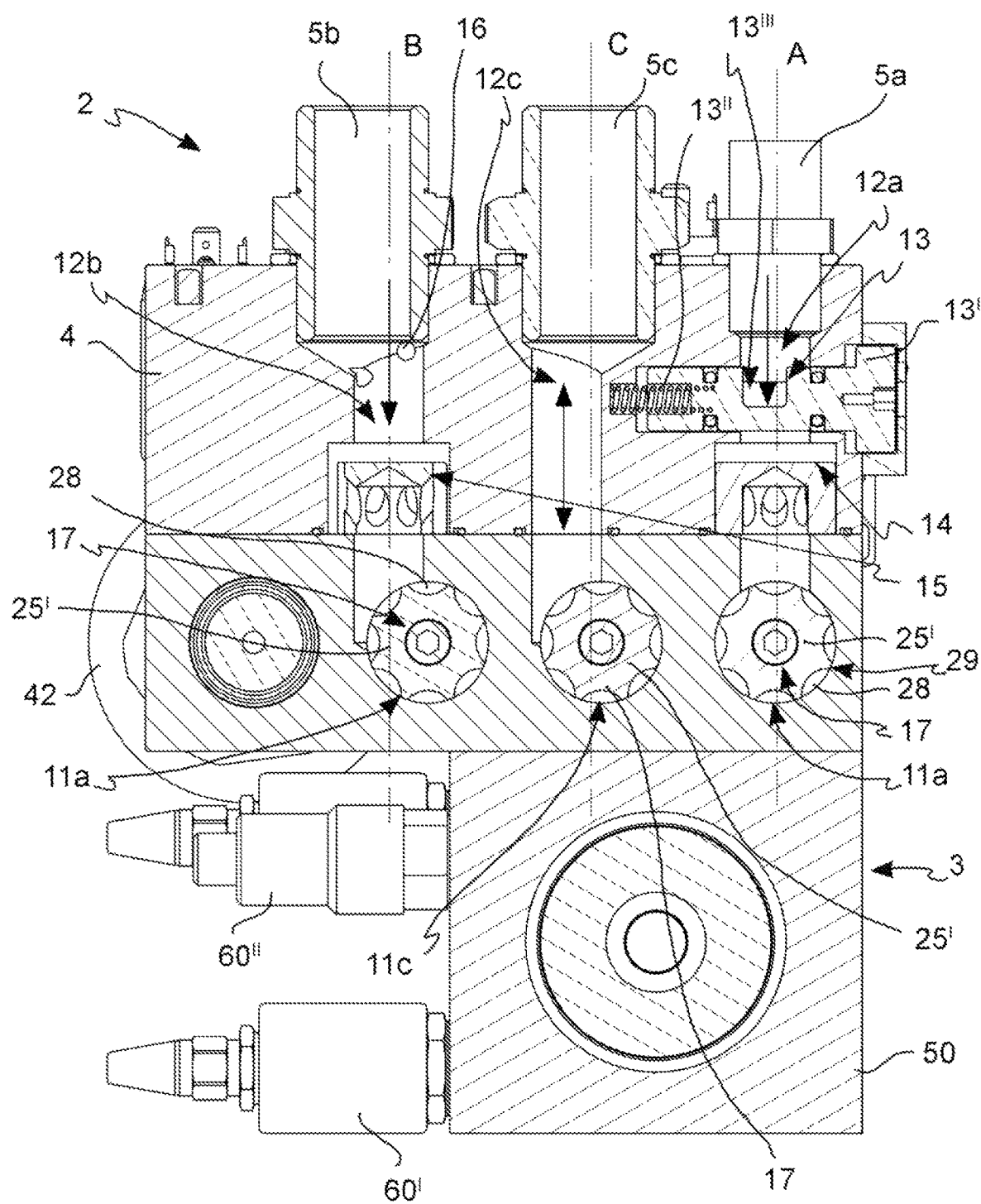
FIG. 3 shows a top view of the valve assembly in FIG. 1, according to a cross section.
Figure 4A:
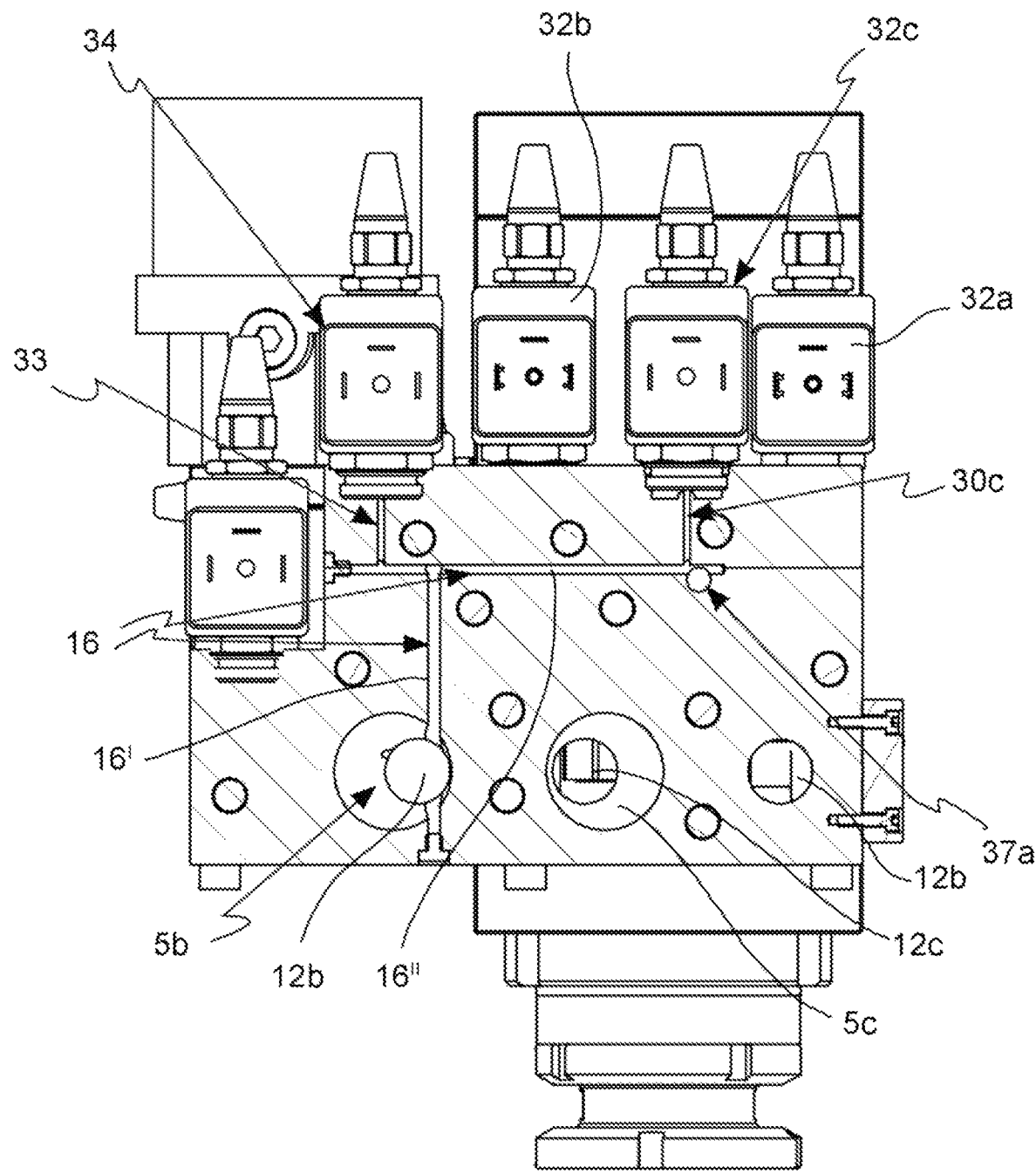
FIG. 4A shows a view according to section IVa in FIG. 2.
Figure 4B:
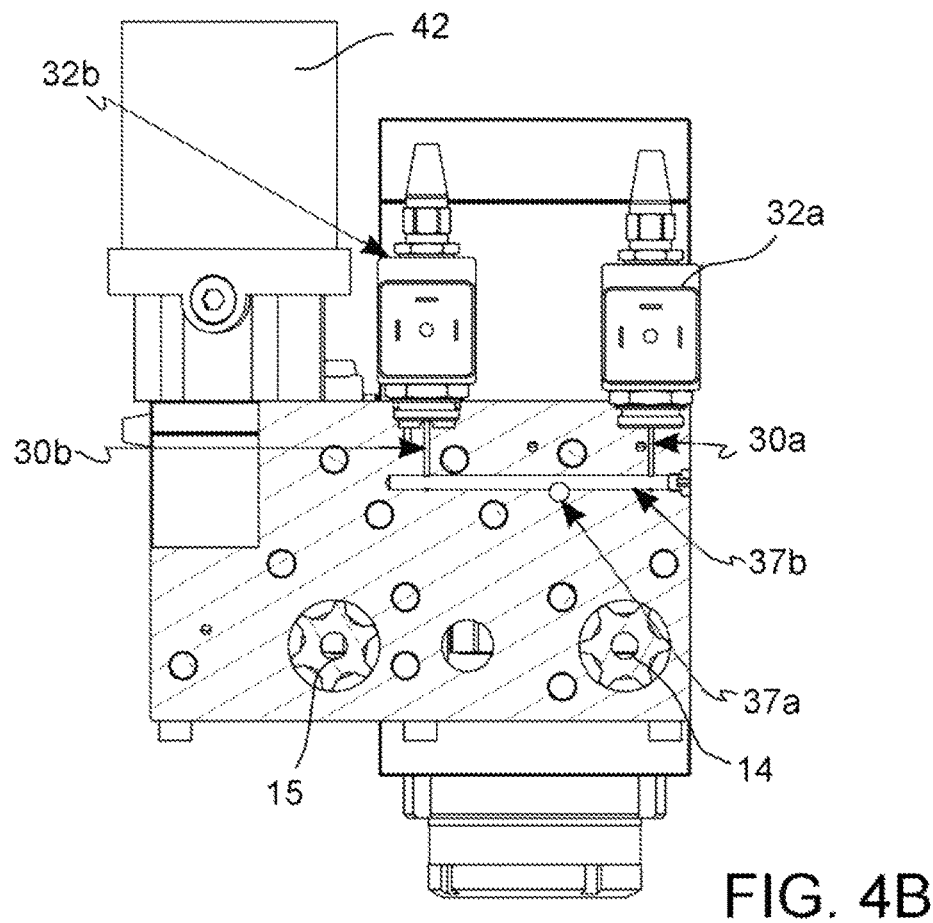
FIG. 4B shows a view according to section IVb in FIG. 2.
Figure 4C:
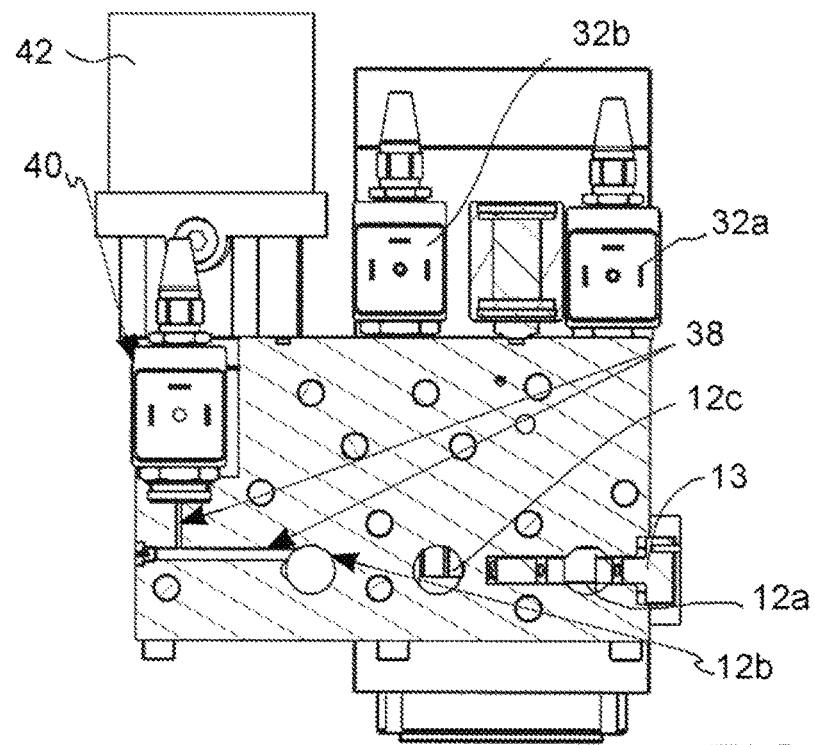
FIG. 4C shows a view according to section IVc in FIG. 2.
Figure 5:
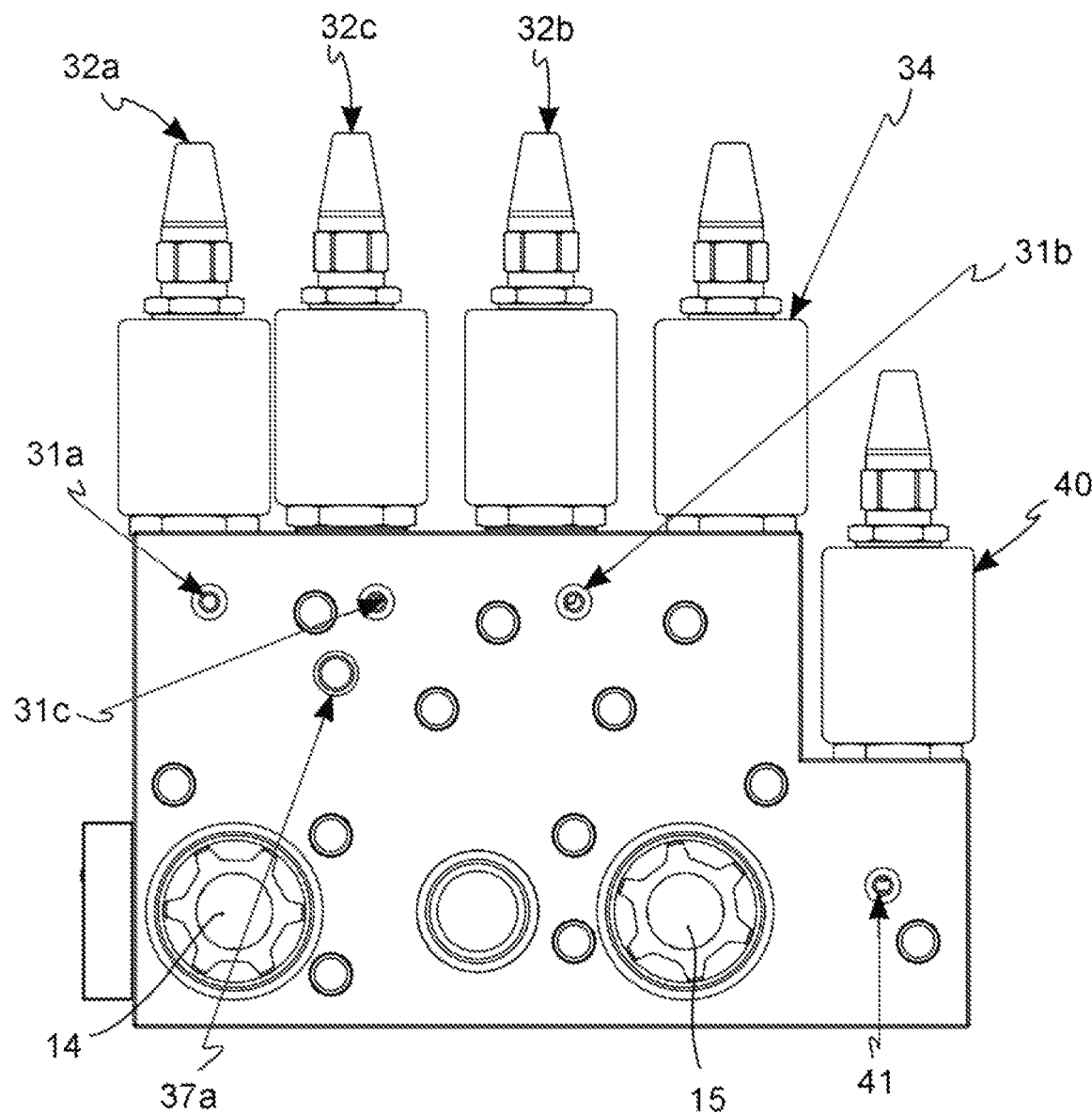
FIG. 5 shows a view according to section V-V in FIG. 2.

FIGS. 3 to 5 show the control block 2 in detail.

The control block 2 comprises a body 4 in which the passages for the pressurized air are obtained. Body 4 comprises a first inlet opening 5a of pressurized air, a second inlet opening 5b of pressurized air and a third inlet-outlet opening 5c of pressurized air, which in the embodiment in the drawings, is placed between the first and the second inlet openings 5a, 5b.

Figure 9:
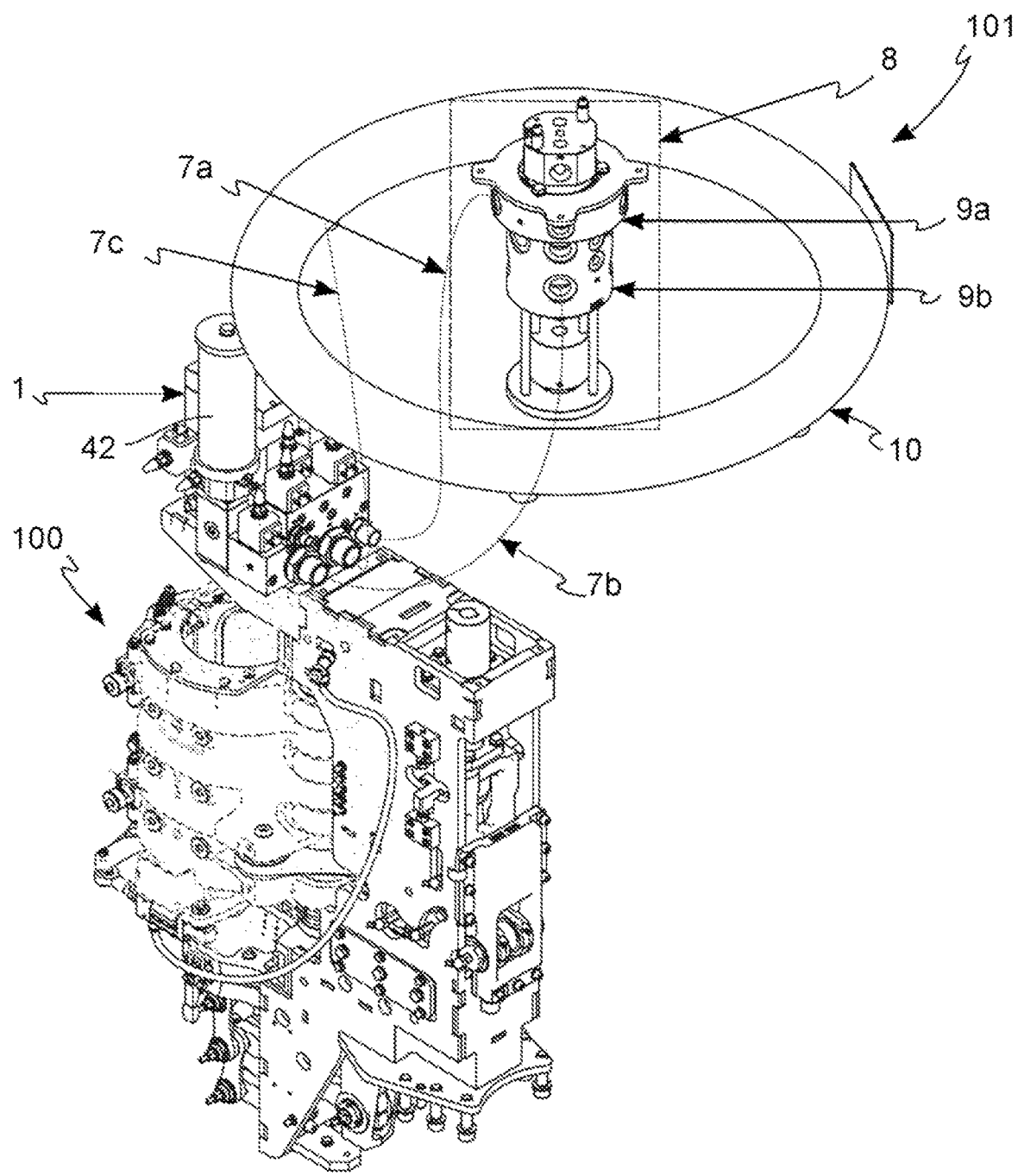
FIG. 9 shows a perspective view of the assembly, comprising the mold, valve assembly and pressurized air manifold.

The openings 5a, 5b, 5c comprise respective sleeves 6a, 6b, 6c for the connection with the pipes for the passage of pressurized air. In particular, with reference to FIG. 9, the sleeves 6a, 6b, 6c are connected to respective first, second and third pipes 7a, 7b, 7c, which in turn are connected to a system 101 for supplying pressurized air comprising a pressurized air manifold 8, having a first chamber 9a for supplying air at said first pressure P1 and a second chamber 9b for supplying air at said second pressure P2, and a storage tank 10.

More specifically:
the first pipe 7a connects said first inlet opening 5a with said first supply chamber 9a;
the second pipe 7b connects said second inlet opening 5b with said second supply chamber 9b;
the third pipe 7c connects said third inlet-outlet opening 5c with the storage tank 10 for storing pressurized air at a pressure Px between P1 and P2.

The pressurized air manifold 8 in turn is connected to one or more pressurized air sources (not shown).

The storage tank 10 is toroidal-shaped in the embodiment in the drawings and encloses manifold 8 within its circumference, but it could have a different shape and position in other embodiments.

Returning to the description of the control block 2, the first inlet opening 5a of pressurized air, dedicated to the pre-blowing step, preferably has a smaller gap than the second and third openings 5b, 5c.

The first inlet opening 5a is connected downstream to a first dispensing valve 11a of pressurized air at said first pressure P1 by means of a first conduit 12a in body 4. Conduit 12a is intercepted by a flow regulator 13 and a unidirectional valve 14, which prevents the pressurized air dispensed with said pressure P1 from returning towards the inlet opening 5a.

The flow regulator 13 comprises a body 13' ending with a threaded portion 13" at the inner end thereof, said threaded portion 13" being coupled to a complementary threaded seat obtained in body 4 of the control block 2. Body 13' of the flow regulator 13 has a hole or groove 13''' which allows regulating the gap for the passage of pressurized air in conduit 12a by means of screwing or unscrewing body 13". Thereby, the correct flow of pressurized air for the pre-blowing, which depends on the features of the container to be made, may be prepared at the beginning of the blowing or draw-blowing procedure.

The second inlet opening 5b is connected downstream to a second dispensing valve 11b of pressurized air at said second pressure P2 by means of a second conduit 12b in body 4. Conduit 12b also is intercepted by a unidirectional valve 15, which prevents the pressurized air dispensed with said pressure P2 from returning towards the inlet opening 5b.

The third inlet opening 5c is connected downstream to a third dispensing valve 11c of pressurized air at said third pressure Px by means of a third conduit 12c in body 4. Conduit 12c is not intercepted by a unidirectional valve because the pressurized air must circulate in both directions, as indicated by the double arrow in FIG. 3.

As shown, for example, in FIG. 7A, the dispensing valves 11a, 11b, 11c are connected to a transverse conduit 21 which in turn comprises an opening 22 (also shown in FIG. 1) which extends perpendicularly so as to connect to the blowing block 3, as described below, so as to provide it with the pressurized air for the container blowing operations.

As shown in FIGS. 7A-7D, the dispensing valves 11a, 11b, 11c are placed perpendicularly with respect to the pressurized air inlet conduits 12a, 12b, 12c. More specifically, with reference to FIG. 8, each of said dispensing valves 11a, 11b, 11c comprises an H-shaped piston 17 comprising a stem 19''', a first head 19', and a second head 19'', in which said heads 19', 19'' have a greater diameter than stem 19'''. Piston 17 slides in a complementary seat 20 which has a middle portion 20''', a first expansion chamber 20' at the first head 19' of piston 17 and a second expansion chamber 20'' at the second head 19'' of piston 17. Therefore, the middle portion 20''' of seat 20 has a smaller diameter than the expansion chambers 20', 20'' and substantially corresponding to the one of the stem 19''' of piston 17. However, a gap 26 is arranged between the middle portion 20''' of seat 20 and the stem 19''' of piston 17, in the section connecting the first expansion chamber 20' to the transverse conduit 21.

Both the first head 19' and the second head 19'' comprise respective outer surfaces 25', 25'' and respective shoulders 24', 24''. The shoulders 24', 24'' are configured to be coupled with respective abutment surfaces 23', 23'' of said expansion chambers 20', 20''.

Stem 19''' and the second head 19'' of piston 17 further comprise gaskets 27, for example, O-rings, for sealing the pressurized air.

As better shown in FIG. 3, the outer surface 25' of the first head 19' of the pistons 17 is star-shaped and comprises a plurality of chamfers 28 which create micro channels along the side surface 29 of the first head 19' and allow the passage of the pressurized air.

Figure 7A:
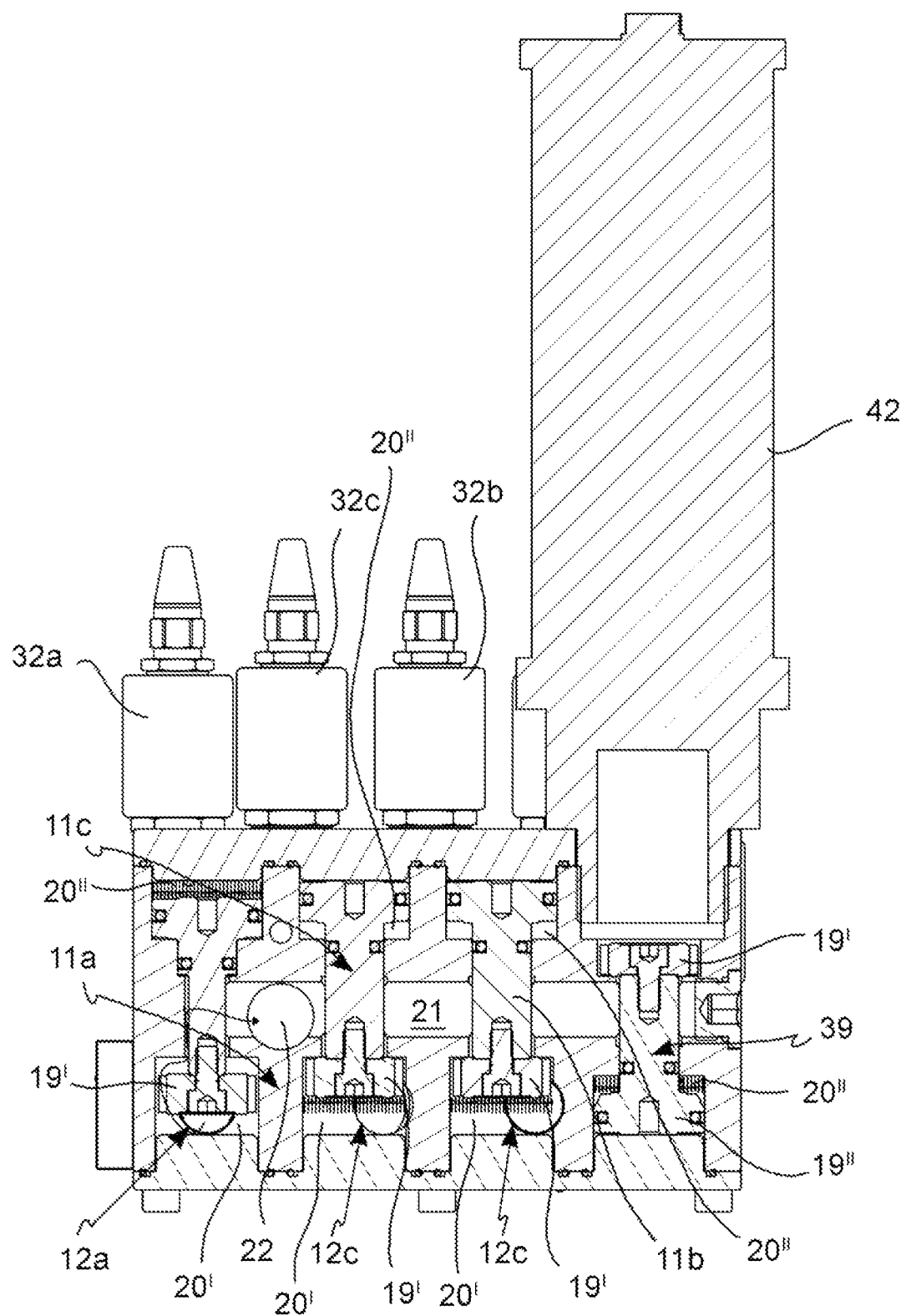
FIG. 7A shows a sectional view according to direction VII-VII in FIG. 2, of a first operating condition.
Figure 8:
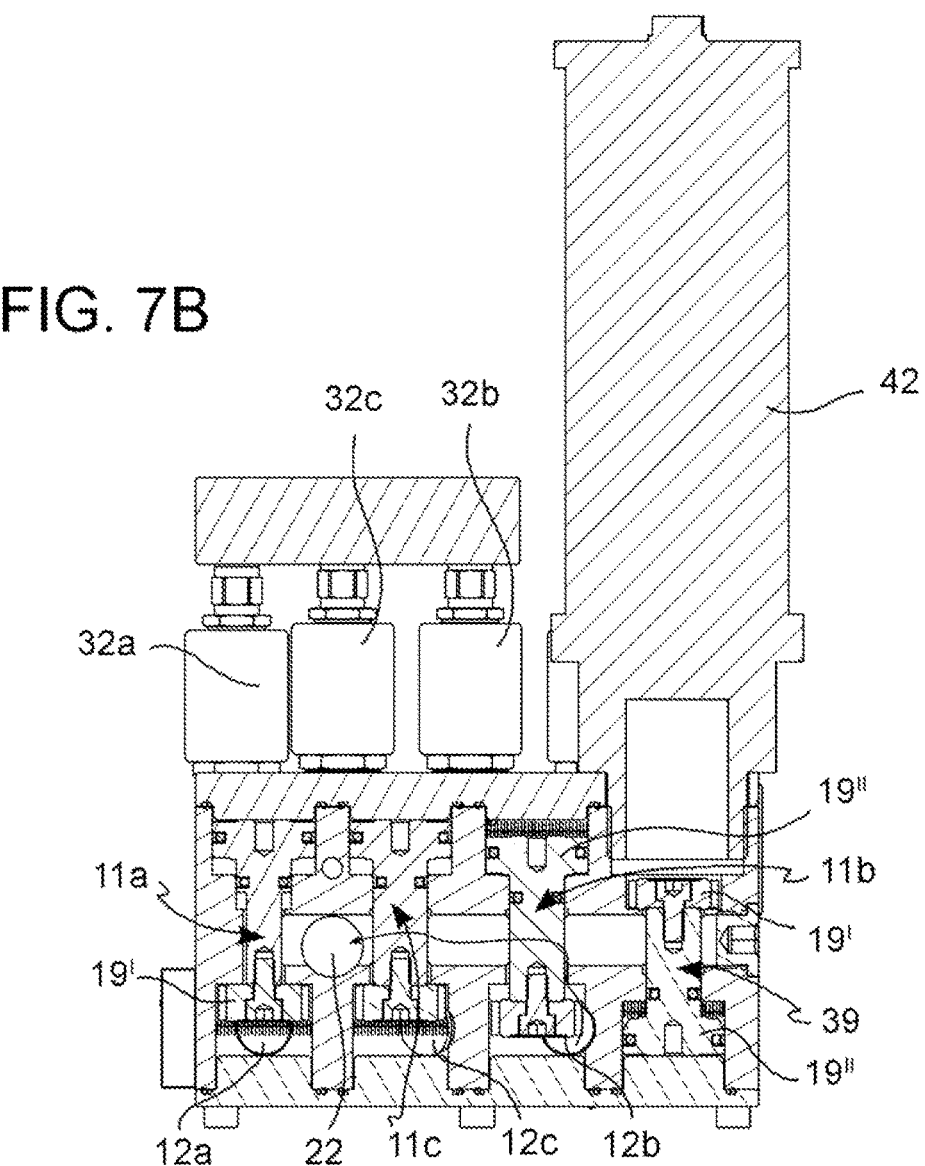
FIG. 8 shows a sectional view of a detail in FIG. 7A.
Figure 8:
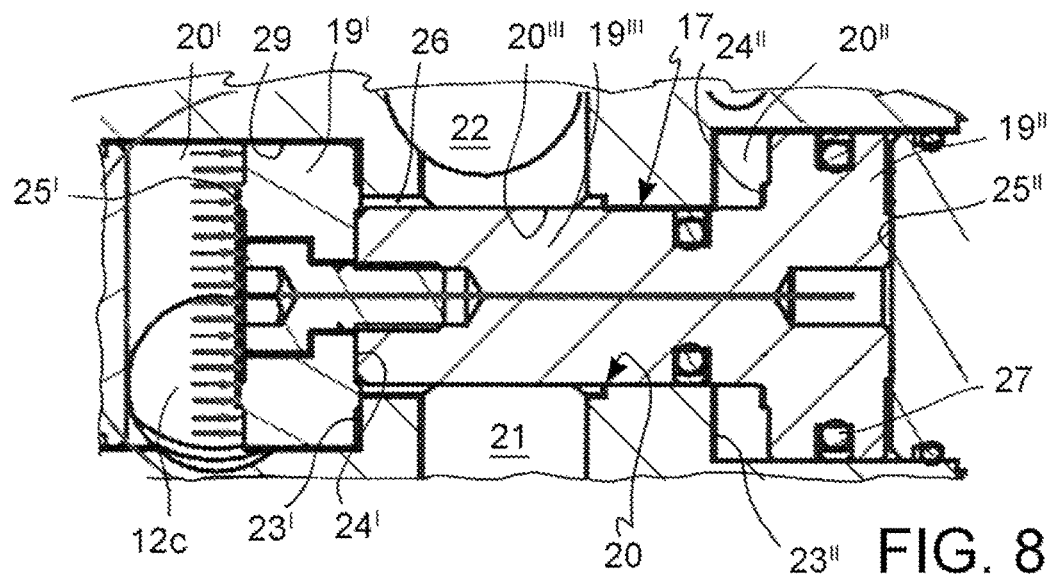

When, as shown, for example, in FIG. 8, shoulder 24' of the first head 19' abuts against the respective abutment surface 23' of seat 20, the pressurized air originating from the conduits 12a, 12b, 12c cannot pass, whereby the dispensing valve 11a, 11b, 11c is in closing condition. If, vice versa, such as, for example, shown in FIG. 7A relatively to the first valve 11a, it is the second head 19" to abut against the respective abutment surface 23" of seat 20, the pressurized air dispensed through conduit 12a can pass through the micro channels of the side surface 29 of the first head 19' and cross gap 26 so as to reach the transverse conduit 21, and by means thereof, the connection opening 22 with the blowing block.

With reference now to FIGS. 4A-4C and 5, a first branch conduit 16, which is T-shaped and comprises a first portion 16' perpendicular to the second conduit 12b and a second portion 16" which extends along a transverse direction with respect to said first, second and third conduits 12a, 12b, 12c and which lies on a plane parallel to the plane on which the axes A, B, C of said first, second and third conduits 12a, 12b, 12c lie, starts from the second conduit 12b for the pressurized air at the second pressure P2.

The following start from the second portion 16" of the first branch conduit 16:
- a second branch conduit 37a which extends perpendicularly to the plane in which the first conduit 16 lies;
- a first driving channel 30c intercepted by a first solenoid control valve 32c;
- a second driving channel 33 intercepted by a second solenoid control valve 34.

With reference to FIG. 4B, a third branch conduit 37b which extends on a plane parallel to the first branch conduit 16 starts from the second branch conduit 37a. A third and fourth driving channel 30a, 30b intercepted by a third and fourth solenoid control valve 32a, 32b, respectively, perpendicularly start from said third branch conduit 37b in the same plane parallel to the first branch conduit 16.

The first, third and fourth solenoid control valves 32c, 32a, 32b drive the third, first and second dispensing valves 11c, 11a, 11b, respectively. In this regard, said solenoid control valves 32a, 32b, 32c start from respective outlet channels 31a, 31b, 31c which lead into the upper part of the second expansion chamber 20" of the respective dispensing valves 11a, 11b, 11c, that is into the upper chambers shown in FIGS. 7A-7D, so as to drive the opening of the dispensing valves 11a, 11b, 11c, as described below.

The second driving channel 33 intercepted by the second solenoid control valve 34 is connected downstream of the latter to a counter-pressure chamber 102, shown in FIGS. 10-12 and described below.

As shown in FIGS. 4C and 5, a fifth driving channel 38 of a pressurized air exhaust valve 39 starts from the second conduit 12b of pressurized air at said second pressure P2.

The exhaust valve 39, shown in FIGS. 7A-7D, is entirely similar to the dispensing valves 11a, 11b, 11c, but it is mounted in reverse position so that the outer surface 25' of the first head 19' faces upwards.

The fifth driving channel 38 is intercepted by a respective solenoid control valve 40 and continues downstream of said solenoid valve 40 in an outlet channel 41 (FIG. 5) which leads into the second expansion chamber 20" of seat 20, in intermediate position between abutment surface 23" and shoulder 24".

The exhaust valve 39 is connected downstream to an air exhaust device 42.

Figure 6A:
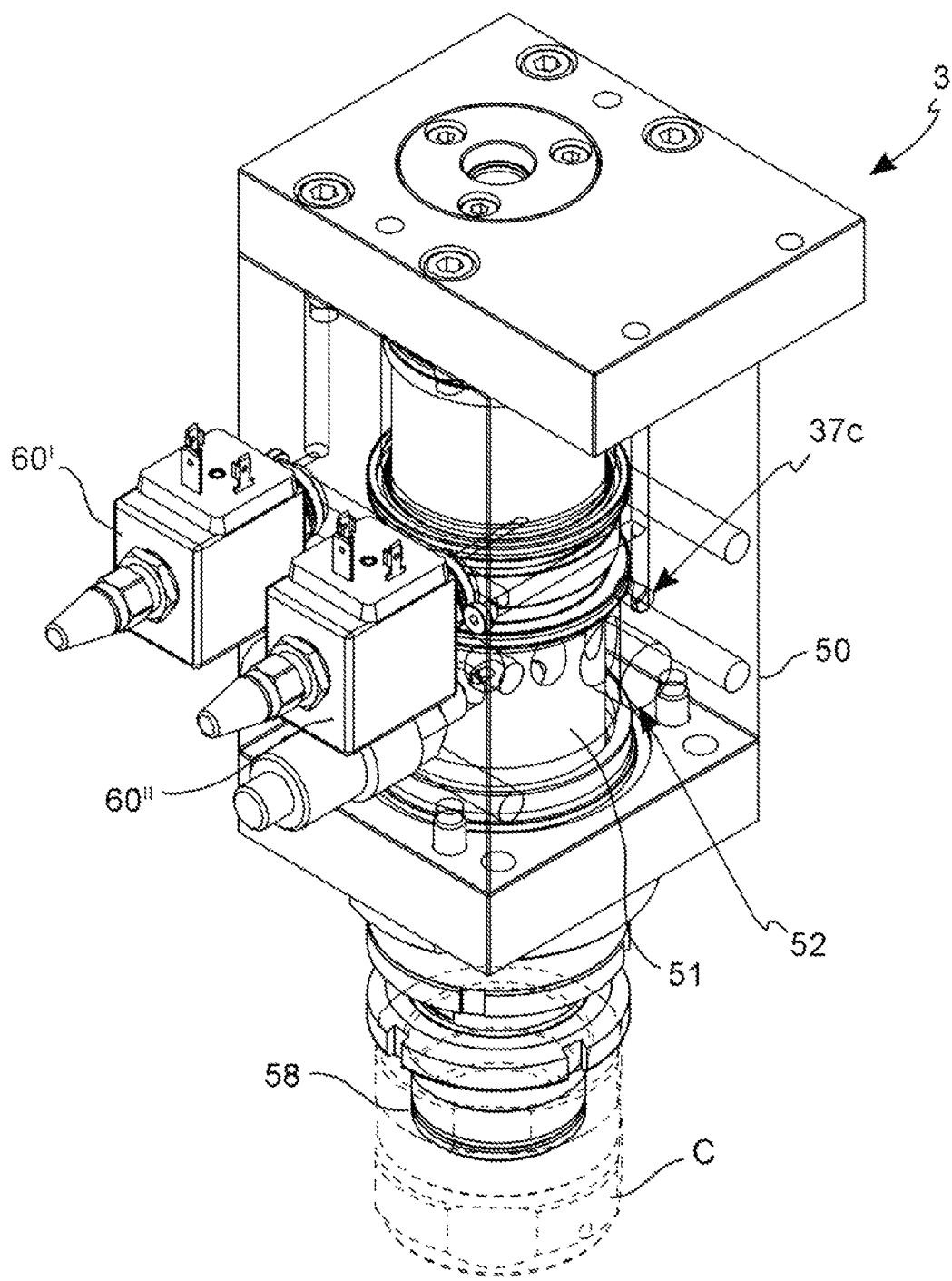
FIG. 6A shows a partial transparency perspective view of the blowing block in FIG. 1.
Figure 6B:
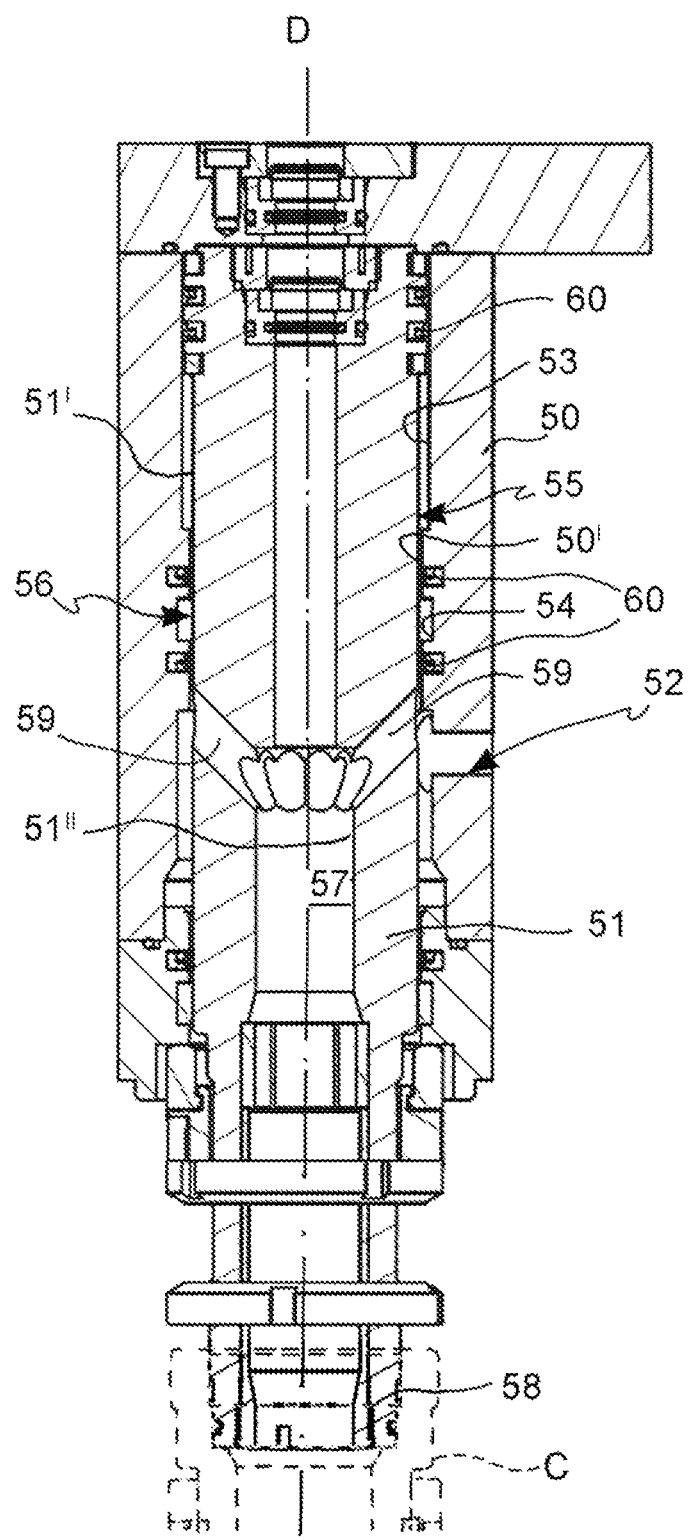
FIG. 6B shows a side sectional view of the blowing block in FIG. 6A.

The blowing block 3, shown in FIGS. 6A-6B, comprises an outer body 50 having a longitudinal axis D, inside which a blowing cylinder 51 is slidingly accommodated.

The outer body 50 comprises an opening 52 which, when the valve assembly 1 is assembled, is put into flow connection with opening 22 of the control block 2 from which the pressurized air is dispensed. The inner surface 50' of the outer body 50 further comprises an upper recess 53 and a lower recess 54 so as to form, with the outer surface 51' of the blowing cylinder 51, an upper annular chamber 55 and a lower annular chamber 56 which are kept airtight at the passage of air by virtue of appropriate gaskets 60, such as, for example, O-rings.

The blowing cylinder 51 slides along axis D and at the bottom comprises a nozzle 58 suitable to engage with the neck of a container C (shown with a dashed line in FIGS. 6A and 6B). The blowing cylinder 51 is hollow, comprising a longitudinal channel 57 which opens outwards at nozzle 58. A plurality of radial channels 59 is arranged between the inner surface 51" and the outer surface 51' of the blowing cylinder 51. The radial channels 59 connect the outside of the blowing cylinder 51 with the longitudinal channel 57 and extend along a downwards tilting direction from the outer surface 51' to the inner surface 51".

The second branch conduit 37a of the control block 2 described above is connected to a conduit 37c of the blowing block 3, which in turn is connected to two solenoid control valves 60', 60" of the blowing block 3, which control the sending of the pressurized air at said second pressure P2 alternately to the upper annular chamber 55 or to the lower annular chamber 56 of the blowing block 3. When the pressurized air is introduced into the upper annular chamber 55, the blowing cylinder 51 slides downwards so as to engage the neck C of the preform. Simultaneously, opening 52 of the outer body 50 from which pressurized air is introduced aligns with the radial channels 59 of the blowing cylinder 51, thus allowing the container to be blown. When instead the pressurized air is introduced into the lower annular chamber 56, the blowing cylinder 51 slides upwards so as to disengage from neck C of the container and discontinue the blowing air flow.

With reference to FIGS. 10-12, they show a mold 100 for blowing or draw-blowing preforms for making containers. Mold 100 comprises two half-molds 100', 100" which may take on a closed position (shown in FIG. 10) and an open position for controlled rotation around a hinge axis 103.

Each half-mold 100', 100" comprises a mold-support 104 and a mold element 105, which outer surface 105', together with the outer surface 105' of the other half-mold, forms the forming cavity of the container. A gap constituting the counter-pressure chamber 102 is arranged between mold-support 104 and mold element 105. Said counter-pressure chamber 102 is connected by means of the openings 106, 106' and suitable pipes to the fourth channel 33 of the control block 2 so that the pressurized air passing through such a conduit imparts a sufficient counter-pressure on the mold element 105 as to counteract the blowing pressure, and thus avoid the partial opening of mold 100.

FIGS. 7A-7D show the various operating steps of the blowing performed by means of the valve assembly 1 of the invention.

The dispensing valves 11a, 11b, 11c and the exhaust valve 39 are in closing condition when the pressurized air originating from the first, second and third conduits 12a, 12b, 12c is introduced into the respective first expansion chambers 20' and when the pressurized air originating from the sixth channel 38, and therefore from the outlet channel 41, is introduced into the second expansion chamber 20". Vice versa, the dispensing valves 11a, 11b, 11c are in opening condition when the pressurized air is introduced into the respective second expansion chambers 20" through the outlet channels 31a, 31b, 31c. Similarly, the exhaust valve 39 is in opening condition when the introduction of pressurized air into the second expansion chamber 20" is discontinued and therefore when the pressurized air originating from the transverse conduit 21 passes through the grooves of the first head 19' and from there, into the first expansion chamber 19'.

FIG. 7A shows the condition in which only the first dispensing valve 11a is open, whereby pressurized air at pressure P1 is introduced into the blowing block 3 for pre-blowing the preform.

FIG. 7B shows the condition in which only the second dispensing valve 11b is open, whereby pressurized air at pressure P2 is introduced into the blowing block 3 for blowing the preform.

Figure 7C:
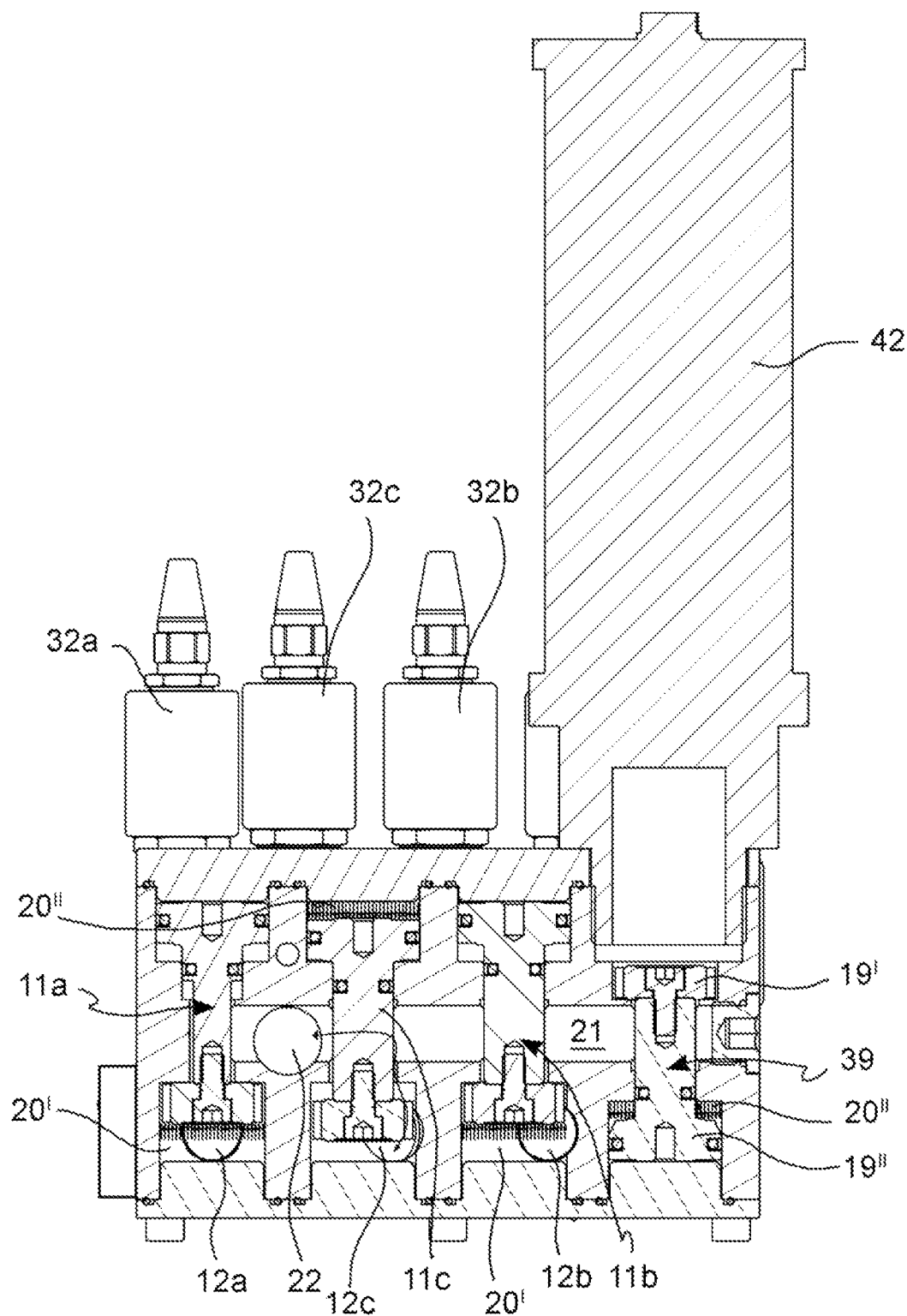
FIG. 7C shows the view in FIG. 7A, in a third operating condition.

FIG. 7C shows the condition in which only the third dispensing valve 11c is open, whereby pressurized air at pressure Px is introduced into or drawn from the blowing block 3 as recovery pressure. Pressure Px therefore varies between a minimum pressure, for example about 4 bar, and a maximum pressure, for example, about 40 bar. At the beginning of the blowing, the excess pressurized air at pressure P1 or P2 is recovered in tank 10 through the third valve 11c, then when the pressure in tank 10 is greater than the pressure dispensed, typically during the pre-blowing, the pressurized air originating from tank 10 is reutilized for the blowing.

Figure 7D:
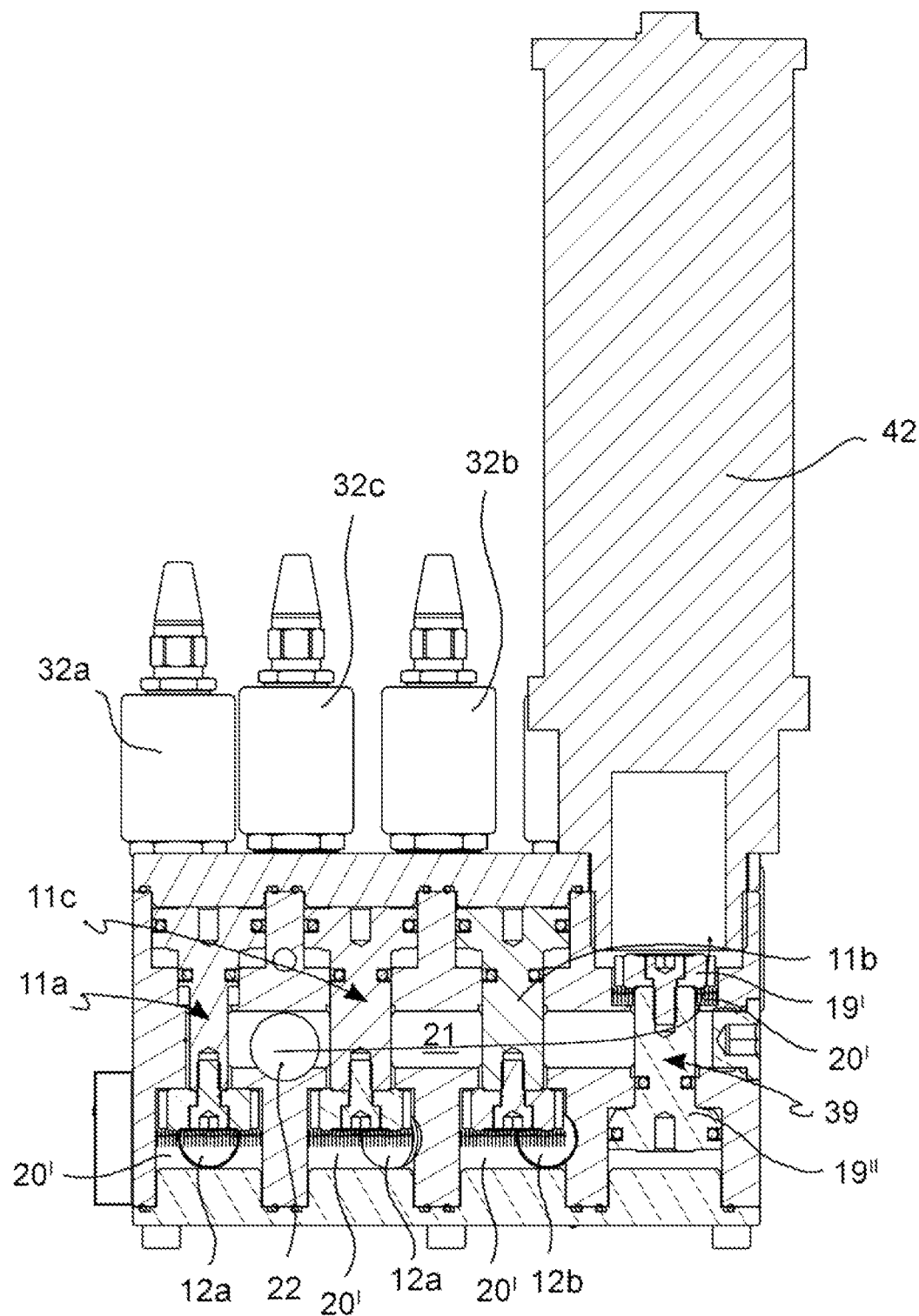
FIG. 7D shows the view in FIG. 7A, in a fourth operating condition.

FIG. 7D instead shows the condition in which only the exhaust valve 39 is open.

The operating sequence of the valves 11a, 11b, 11c, 39, implemented by means of the respective solenoid control valves 32a, 32b, 32c, 40 controlled by a control unit, can be programmed and is determined by the type of blowing cycle required.

One advantage of the valve assembly 1 of the invention with respect to the known devices is that the branch from conduit 12b of pressurized air at a high pressure (pressure P2) is used without any reduction in pressure for driving all the dispensing 11a, 11b, 11c and exhaust 39 valves. This allows having increased thrust on the pistons 17, which therefore may have a thrust surface 25', 25" with a smaller width. Therefore, there will be a smaller air volume, a reduced dead volume of air in the valve, reduced dimensions of the valves themselves, and increased reactivity of the valve following the implementation of the solenoid valves.

Another advantage lies in the fact that the same pressurized air at pressure P2 is directly sent to the counter-pressure chamber 102, with the sole interposition of the solenoid control valve 34.

It is apparent that only some particular embodiments of the present invention have been described, to which those skilled in the art will be able to make all changes required to adapt it to particular applications, without departing from the scope of protection of the present invention.

What we claim is:

1. A valve assembly (1) comprising a control block (2) and a blowing block (3), wherein the blowing block (3) comprises an outer body (50) having a longitudinal axis (D), inside which a blowing cylinder (51) ending at the bottom with a nozzle (58) suitable to be coupled with the neck of a container (C), is slidingly accommodated, and wherein the control block (2) receives pressurized air from at least one pressurized air source and sends it to said blowing block (3) according to a predetermined pressure profile dependent on a selected blowing cycle, wherein the control block (2) comprises a plurality of dispensing valves (11a, 11b, 11c) for dispensing pressurized air at different pressures, and an air exhaust valve (39), characterized in that said dispensing valves and said air exhaust valve (11a, 11b, 11c, 39) are driven by pressurized air at a pressure between 15 and 40 bar, wherein the control block (2) comprises a first conduit (12a) for pressurized air at a first pressure (P1), a second conduit (12b) for pressurized air at a second pressure (P2) that is greater than the first pressure (P1), and a third conduit (12c) for pressurized recovery air at a third pressure (Px) that varies in a range greater than or equal to said first pressure (P1) and less than or equal to said second pressure (P2), wherein said first, second, and third conduits (12a, 12b, 12c) are intercepted by first, second, and third dispensing valves (11a, 11b, 11c) of pressurized air, at said first, second, and third pressure (P1, P2, Px), respectively, wherein said dispensing valves (11a, 11b, 11c) are connected to a transverse conduit (21) that comprises a connection opening (22) to the blowing block (3), wherein a first branch conduit (16), which is T-shaped and comprises a first portion (16') perpendicular to the second conduit (12b) and a second portion (16") extending along a transverse direction with respect to said first, second, and third conduits (12a, 12b, 12c) and which lies on a plane parallel to the plane on which axes of said first, second, and third conduits (12a, 12b, 12c) lie, starts from the second conduit (12b) for the pressurized air at the second pressure (P2), and wherein the following starts from said second portion (16") of the first branch conduit (16):
a second branch conduit (37a) that extends perpendicularly to the plane in which the first branch conduit (16) lies;
a first driving channel (30c) intercepted by a first solenoid control valve (32c); and
a second driving channel (33) intercepted by a second solenoid control valve (34), wherein a third branch conduit (37b) that extends on a plane parallel to the first branch conduit (16) starts from the second branch conduit (37a), and wherein a third and a fourth driving channel (30a, 30b) intercepted by a third and fourth solenoid control valve (32a, 32b), respectively, perpendicularly start from said third branch conduit (37b) in the same plane parallel to the first branch conduit (16).

2. The valve assembly (1) according to claim 1, wherein said first, second, and third dispensing valves (11a, 11b, 11c) and said air exhaust valve (39) are placed perpendicularly to said first, second, and third conduits (12a, 12b, 12c), respectively, and to said transverse conduit (21), and wherein each of said dispensing valves (11a, 11b, 11c) and said air exhaust (39) valves comprises:

an H-shaped piston (17) comprising a stem (19'''), a first head (19'), and a second head (19"), wherein said heads (19', 19") have a greater diameter than the stem (19'''); and a complementary seat (20) in which the piston (17) slides, said complementary seat (20) having a middle portion (20'''), a first expansion chamber (20') at the first head (19') of the piston (17), and a second expansion chamber (20") at the second head (19") of the piston (17), in which:
i) both the first head (19') and the second head (19") comprise respective outer surfaces (25', 25") and respective shoulders (24', 24"), the shoulders (24', 24") being configured to be coupled with the respective abutment surfaces (23', 23") of said expansion chambers (20', 20"),
ii) a gap (26) is arranged between the middle portion (20''') of the seat (20) and the stem (19''') of the piston (17), in a section connecting the first expansion chamber (20') to the transverse conduit (21), and
iii) the outer surface (25') of the first head (19') of the pistons (17) is star-shaped and comprises a plurality of chamfers (28) that create micro channels along a side surface (29) of the first head (19'), said micro channels being configured to allow the passage of pressurized air through the gap (26).

3. The valve assembly (1) according to claim 2, wherein the exhaust valve (39) is connected downstream to an air exhaust device (42), wherein a fifth driving channel (38) of said air exhaust valve (39) starts from the second conduit (12b) of pressurized air at said second pressure (P2), wherein said exhaust valve (39) is mounted in reverse position with respect to the dispensing valves (11a, 11b, 11c) so that the outer surface (25') of the first head (19') faces upwards, wherein the fifth channel (38) is intercepted by a respective solenoid control valve (40) and continues downstream of said respective solenoid valve (40) in an outlet channel (41) that leads into the second expansion chamber (20") of the seat (20), in intermediate position between said abutment surface (23") and said shoulder (24").

4. The valve assembly (1) according to claim 1, wherein the first, third, and fourth solenoid control valves (32c, 32a, 32b) drive the third, first, and second dispensing valves (11c, 11a, 11b), respectively, by means of respective outlet channels (31a, 31b, 31c) that start from said solenoid control valves (32a, 32b, 32c) and lead into the upper part of the second expansion chamber (20") of the respective dispensing valves (11a, 11b, 11c).

5. The valve assembly (1) according to claim 1, wherein the second driving channel (33) intercepted by the second solenoid control valve (34) is connected downstream of the latter to a counter-pressure chamber (102) of a mold (100).

6. The valve assembly (1) according to claim 1, wherein the outer body (50) of the blowing block (3) comprises an opening (52) that is put into flow connection with the connection opening (22) of the control block (2) from which the pressurized air is dispensed, an inner surface (50') of the outer body (50) further comprising an upper recess (53) and a lower recess (54) so as to form an upper annular chamber (55), and a lower annular chamber (56) with an outer surface (51') of the blowing cylinder (51), wherein the blowing cylinder (51) is hollow and comprises a longitudinal channel (57) that opens outwards at the nozzle (58), there being arranged, between an inner surface (51") and the outer surface (51') of the blowing cylinder (51), a plurality of radial channels (59) that connect the outside of the blowing cylinder (51) with the longitudinal channel (57) and extend along a downwards tilting direction from the outer surface (51') to the inner surface (51"), and wherein said second branch conduit (37a) of the control block (2) is connected to a conduit (37c) of the blowing block (3), which in turn is connected to two solenoid control valves (60', 60") of the blowing block (3), which are configured to send pressurized air at said second pressure (P2) alternately to the upper annular chamber (55) or to the lower annular chamber (56), so that when the pressurized air is introduced into the upper annular chamber (55), the blowing cylinder (51) slides downwards up to engaging the neck of a preform, and simultaneously the opening (52) of the outer body (50) from which the pressurized air is introduced aligns with the plurality of radial channels (59) of the blowing cylinder (51); when instead the pressurized air is introduced into the lower annular chamber (56), the blowing cylinder (51) slides upwards so as to disengage from the neck of the container and discontinue the blowing air flow.

7. The valve assembly (1) according to claim 1, wherein said first and second conduits (12a, 12b) are pneumatically connected to a pressurized air manifold (8) comprising a first chamber (9a) for supplying pressurized air at said first pressure (P1) and a second chamber (9b) for supplying pressurized air at said second pressure (P2), and wherein said third conduit (12c) is connected to a storage tank (10) of pressurized air at said third pressure (Px).

8. The valve assembly (1) according to claim 1, wherein the first conduit (12a) is intercepted by a flow regulator (13) of said pressurized air at said first pressure (P1).

9. The valve assembly (1) according to claim 1, wherein said first and second conduits (12a, 12b) are intercepted upstream of said dispensing valves (11a, 11b) by respective unidirectional valves (14, 15) configured to prevent the pressurized air at said first and second pressures (P1, P2) from returning towards a manifold (8).

10. A machine for blowing or draw-blowing containers, comprising a plurality of molds (100), a valve assembly (1) according to claim 1 being mounted on each mold (100), said machine comprising at least one pressurized air manifold (8) comprising a first chamber (9a) for supplying pressurized air at said first pressure (P1) and a second chamber (9b) for supplying pressurized air at said second pressure (P2), and at least one storage tank (10) of pressurized air at said third pressure (Px).

* * * * *